P. H. VAUGHN.
GRAIN SEPARATOR.
APPLICATION FILED MAR. 1, 1920.
1,428,926.
Patented Sept. 12, 1922.
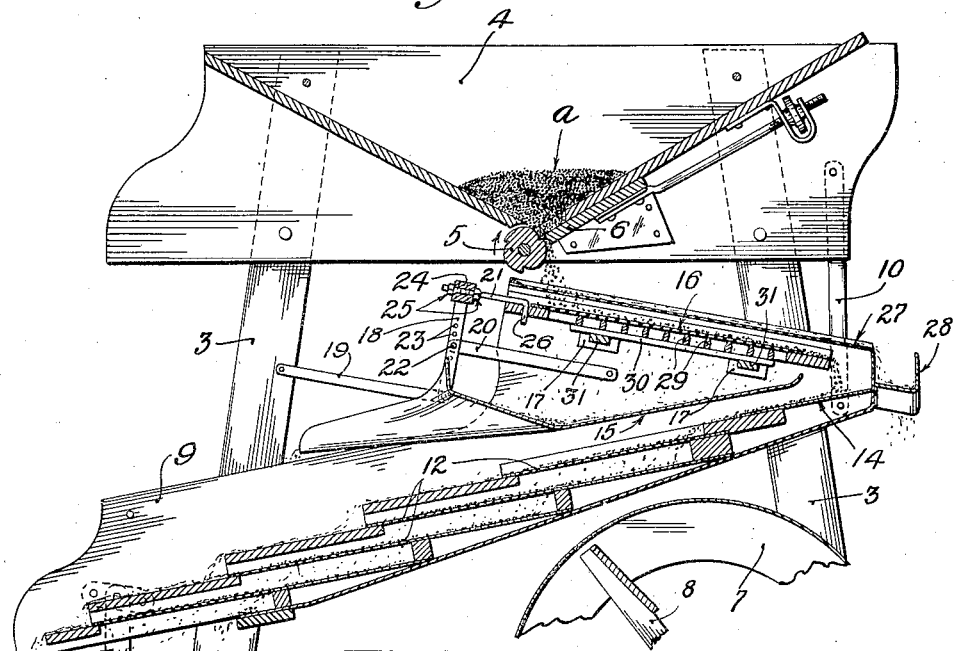
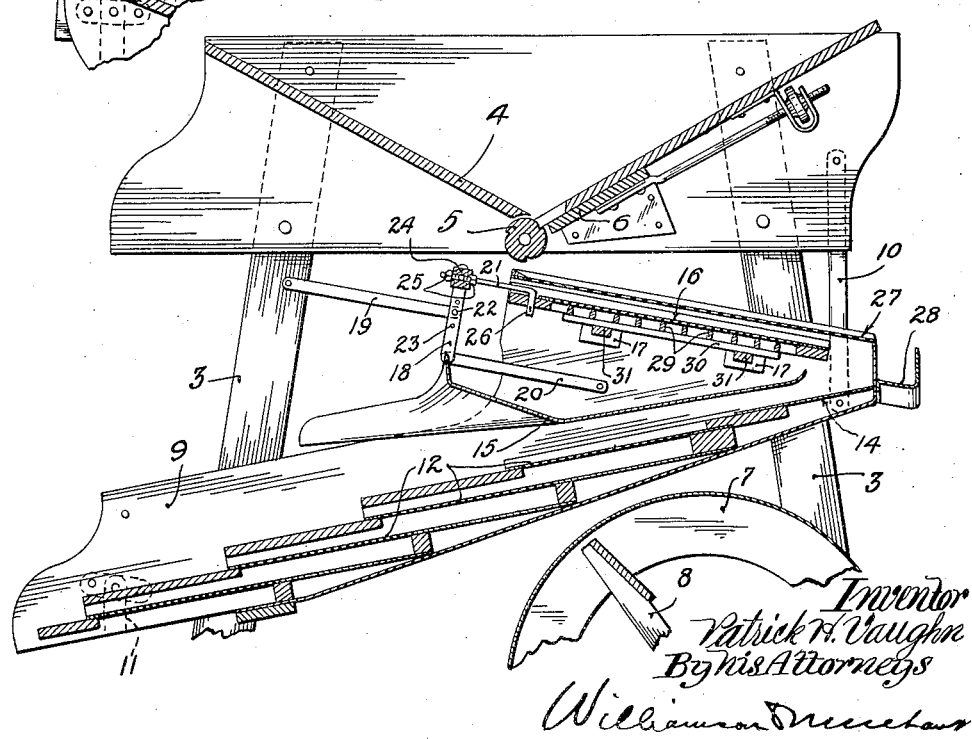
Inventor
Patrick H. Vaughn
By his Attorneys Patented Sept. 12, 1922.

1,428,926

UNITED STATES PATENT OFFICE.

PATRICK H. VAUGHN, OF MORRIS, MINNESOTA.

GRAIN SEPARATOR.

Application filed March 1, 1920. Serial No. 362,367.

*To all whom it may concern:*

Be it known that I, PATRICK H. VAUGHN, a citizen of the United States, residing at Morris, in the county of Stevens and State of Minnesota, have invented certain new and useful Improvements in Grain Separators; and I do hereby declare the following to be a full, clear, and exact description of the invention, such as will enable others skilled in the art to which it appertains to make and use the same.

My present invention relates to improvements in grain separators and is directed to a modification of species of the invention described and broadly claimed in an application filed by me on Mar. 1, 1921, under S. N. 362,366.

To the above end, the invention consists of the novel devices and combinations of devices hereinafter described and defined in the claims.

In the accompanying drawings, which illustrate the invention, like characters indicate like parts throughout the several views.

Referring to the drawings:—

Fig. 1 is a fragmentary view of the improved grain separator in longitudinal central section; and Fig. 2 is a view corresponding to Fig. 1, but showing modified operating connections for reciprocating the screening sieve.

Of the parts of the grain separator shown and fully described in my above identified application, it is important to note the frame 3, hopper 4, feed roller 5, adjustable gate 6, fan casing 7, fan 8, shoe 9, link 10 for supporting the front end of said shoe from the frame 3, an intermediately fulcrumed lever 11 for supporting the rear end of the shoe 9 and reciprocating the same, gang of scalping sieves 12, mounted in the shoe 9, imperforate deck 14 at the receiving end of the uppermost sieve of the gang 12, and catch-pan 15 carried by the shoe 9.

Referring first to the invention as shown in Fig. 1, the numeral 16 indicates a screening sieve carried by the shoe 9 above the catch-pan 15 and oblique to the movement of said shoe and inclined in an opposite direction from the gang of sieves 12. This screening sieve 16 is mounted for reciprocatory movement on cleats 17 secured to the sides of the shoe 9.

To reciprocate the screening sieve 16, there is provided a pair of vertically disposed levers 18, the lower ends of which are fulcrumed to the rear legs of the frame 3 by links 19. The levers 18 are intermediately pivoted to the sides of the shoe 9 by links 20 and adjustably connected to the screening sieve 16 by a link 21. These connections 18 to 21, inclusive, are arranged to cause the screening sieve 16 to move simultaneously with the shoe 9 in the same direction and may be adjusted so that the said screening sieve 16 moves at the same speed with the shoe or at a different speed. To vary the speed of the screening sieve, the link 20 is connected to the levers 18 by pins 22 adapted to be inserted through any one pair of aligned longitudinally spaced holes 23 in said levers 18.

The link 21 is in the form of a rod, one end of which is inserted through a bore in the intermediate portion of a rock-bar 24 and adjustably connected thereto to vary the operative length of said link by a pair of opposing nuts 25, which have screw-threaded engagement with said link. The ends of the rock-bar 24 may be journaled in any one aligned pair of a multiplicity of longitudinally spaced holes in the upper ends of the levers 18. The other end of the link 21 is bent laterally downward to form a pivot pin 26 mounted in a bore in upper transverse portion of the frame of the screening sieve 16.

The upper end of the screening sieve 16 is located under the discharge opening 5 in the hopper 4, and the lower end thereof is located over the deck 14 and arranged to discharge thereon. Mounted in the shoe 9, over the screening sieve 16 and substantially parallel thereto, is a very coarse scalping screen 27, the lower end of which is extended beyond the lower end of the screening sieve 16, over the deck, and arranged to discharge into a transverse trough 28, which is inclined to deliver materials precipitated therein to the left side of the grain separator.

A multiplicity of laterally spaced transverse cleaning bars 29 are located under the screening sieve 16 and arranged to scrape the under surface of said sieve during the reciprocatory movement thereof, to keep the same clean and permit the use of a wire mesh screen. These cleaning bars 29 are connected by longitudinal bars 30, which, in turn, are connected by transverse bars 31, the ends of which are mounted in seats formed in the cleats 17 and removably support the rake bars in the shoe 9. Obviously, by raising or lowering the connections between the levers 18 and links 20 or by moving the rock-bar 24 toward or from the fulcrums of said levers, the throw of the screening sieve 16 may be varied, at will, in respect to the shoe 9.

Referring now to the invention as shown in Fig. 2, it will be noted that the links 19 are pivoted to intermediately connect the rear legs of the frame 3, and the links 20 are pivoted to fulcrum the lower ends of the levers 18 to the shoe 9. By this arrangement of the operating connections 18 to 21, inclusive, for the screening sieve 16, said sieve is simultaneously moved in an opposite direction from the direction of movement of the shoe 9 and said connections may be adjusted, as previously described, so that the screening sieve 16 and shoe 9 move at substantially the same speed or at different speeds.

*Operation.*

Materials to be separated are placed in the hopper 4, as indicated at *a*, and the feed-roller is rotated in the proper direction to carry the materials *a* from the hopper 4 and precipitate the same onto the scalping sieve 27. Suitable connections, not shown, will also be provided for operating the levers 11 to reciprocate the shoe 9. The mesh of the scalping sieve 27 is such as to permit all materials to pass therethrough, except coarse trash, such as sticks, straws and the like. This trash is carried downward over the scalping sieve 27 and delivered to the trough 28, which carries the same to one side of the grain separator. Materials *a*, deposited on the screening sieve 16, are subjected to bouncing action produced by the rise and fall of said sieve due to its oblique relation to the movement of travel of the shoe 9 by which it is carried. This bouncing action of the materials *a*, on the screening sieve 16, releases therefrom all dust, and small foul seeds which are screened through said sieve and precipitated into the catch-pan 15, as indicated at *b*, and conveyed thereby to one side of the grain separator. By thus first separating the dust and small foul seeds from the materials *a*, the machine is free from dust when said materials are subjected to the air blast after passing through the scalping sieves 12. It also immediately relieves the machine from handling such materials as removed by the screening sieve 16. Materials tailed over the screening sieve 16 are precipitated onto the deck 14 and the direction of travel thereof reversed by said deck, from the front to the rear of the grain separator. From the deck 14, the remaining materials *a*, to be separated, are delivered to the scalping screens 12.

Further separation of the materials, is fully set forth in my U. S. Letters Patent #1,321,263, issued November 11, 1919.

In addition to the bouncing action imparted to the materials on the screening sieve 16, the same are caused to travel very rapidly downward over said sieve by the reciprocatory movement thereof produced by the shoe 9 through the connections 18 to 21, inclusive, thereby greatly increasing the efficiency and capacity of the machine.

What I claim is:—

1. In a grain separator, the combination with a feed-hopper, of a sieve-equipped shoe, means for vibrating the shoe, a screening sieve mounted in the shoe between the upper sieve of said shoe and the hopper, and means for vibrating the screening sieve from the shoe either in the same direction therewith or in an opposite direction in respect thereto.

2. In a grain separator, the combination with a feed-hopper, of a sieve-equipped shoe, means for vibrating the shoe, a screening sieve mounted in the shoe between the upper sieve of said shoe and the hopper, and means for vibrating the screening sieve from the shoe either in the same direction therewith or in an opposite direction in respect thereto but at a different speed.

3. In a grain separator, a frame, a hopper secured therein, a shoe mounted for swinging movement in the frame and having a plurality of inclined sieves therein, a screen mounted for sliding movement in said shoe and inclined oppositely to said sieves and disposed between the hopper and said sieves, a link connected at one end to the frame, another link connected at one end to the shoe, and a lever having a pitman connection with said screen to which the other ends of said links are attached at spaced points.

4. The structure set forth in claim 3, said lever having a plurality of attaching means therein whereby said links can be connected thereto in a plurality of different positions to give different relative speeds of vibration between said shoe and said screen.

In testimony whereof I affix my signature in presence of two witnesses.

PATRICK H. VAUGHN.

Witnesses:
 WINIFRED I. WARD,
 HARRY D. KILGORE.